United States Patent [19]

Riser et al.

[11] Patent Number: 4,827,241

[45] Date of Patent: May 2, 1989

[54] COMBINED, IN-LINE SPACER AND SWITCH, PARTICULARLY FOR A VEHICLE'S HEADLIGHT

[75] Inventors: William M. Riser, Zanesville; Edward W. Gray, Nashport; Terry D. Riser, Zanesville, all of Ohio

[73] Assignee: United Technologies Automotive, Inc., Dearborn, Mich.

[21] Appl. No.: 116,085

[22] Filed: Nov. 3, 1987

[51] Int. Cl.⁴ ............................................ H01C 10/36
[52] U.S. Cl. .................... 338/172; 338/191; 338/198; 338/200
[58] Field of Search ............... 338/172, 179, 191, 198, 338/200

[56] References Cited

U.S. PATENT DOCUMENTS

| | | | |
|---|---|---|---|
| 3,840,383 | 10/1974 | Ja et al. | 338/200 X |
| 4,081,782 | 3/1978 | Hildreth et al. | 338/198 X |
| 4,117,444 | 9/1978 | Hildreth et al. | 338/200 X |
| 4,682,142 | 7/1987 | Lohner et al. | 338/198 X |
| 4,692,805 | 9/1987 | Lopez et al. | 338/198 |

Primary Examiner—C. L. Albritton

[57] ABSTRACT

A composite headlight switch with buzzer circuit for use in a vehicle with, for example, a dome light, the dome light switch being located in line with the remaining switch elements in a front area of the overall switch structure, which front area was previously occupied by a spacer, rather than having the dome light switch located outboard on the exterior side of the overall switch structure as in the prior art. The dome light switch structure comprises front and back elements which include sandwiched between them a centrally located driver having a laterally extending peripheral cam. Two electrical contactors are likewise included sandwiched between the front and back elements with opposed, overlapping legs having opposed electrical dimple contacts at their distal ends between them, the travel of the cam sweeping between the overlapped distal legs of the contactors, causing them to become disengaged and with movement back then allowing them to become re-engaged, breaking and making, respectively, the electrical circuit of the switch. The front element of the switch includes in its central area, a circular, longitudinally extended section and, laterally extending radially out of one side, a supporting stem or shaft, which in combination emulate the structural characteristics of the prior art spacer, the switch serving both the electrical, dome light switching function, as well as the spacer function in the front end of the overall, composite headlight switch structure.

9 Claims, 4 Drawing Sheets

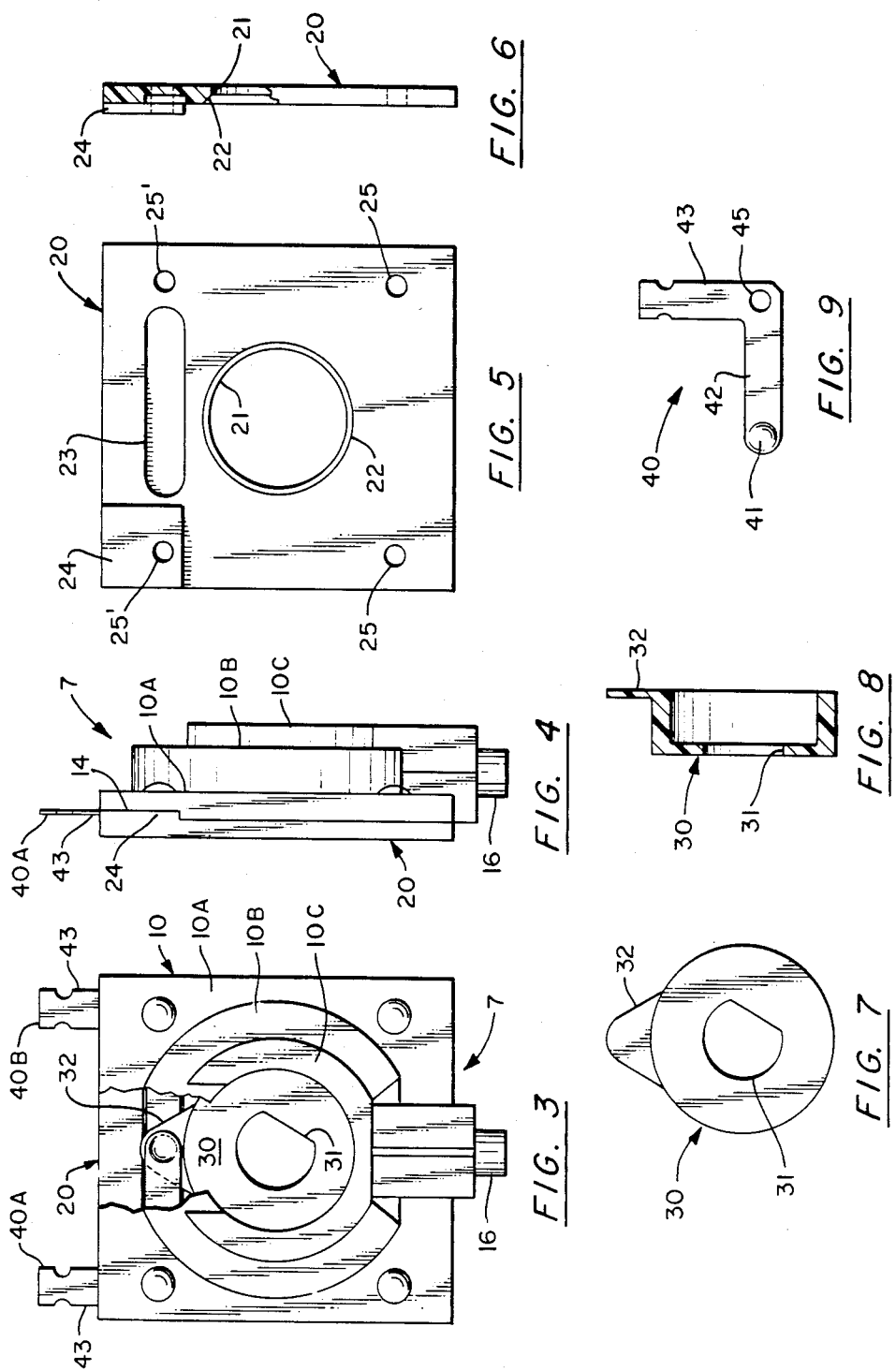

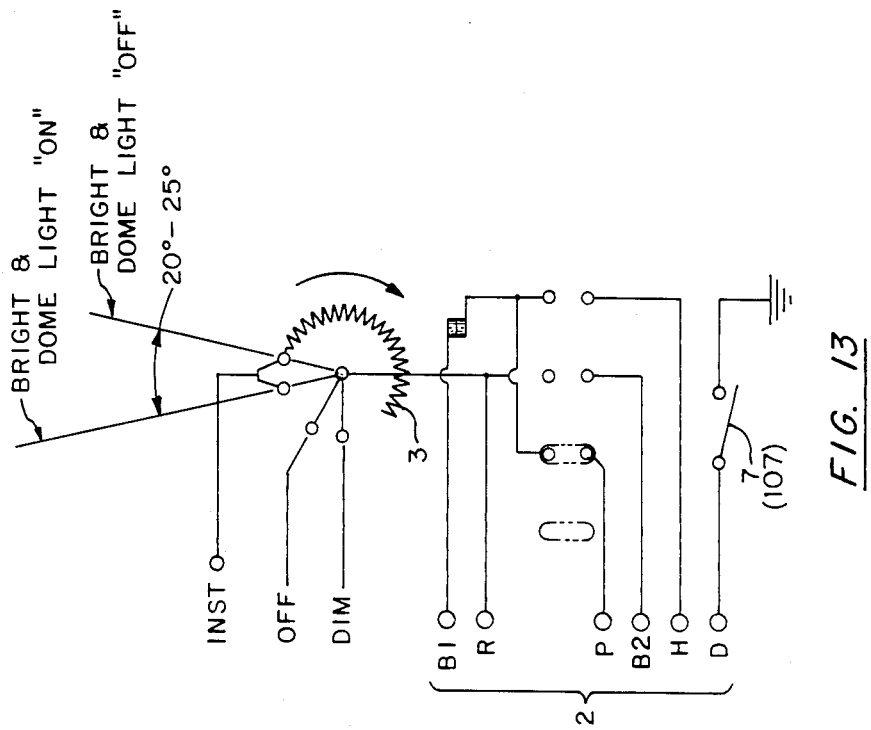
FIG. 13
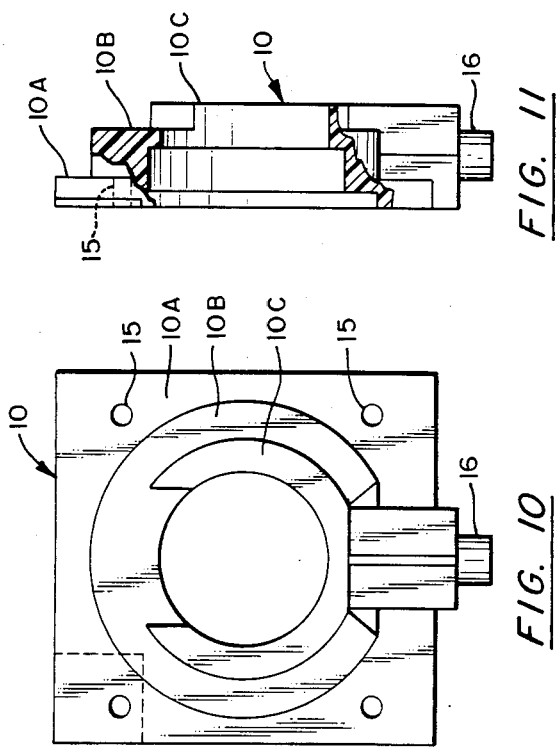
FIG. 11
FIG. 10
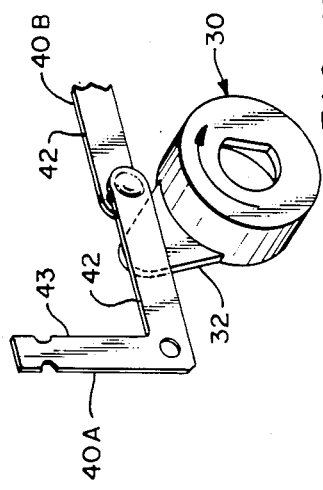
FIG. 12

COMBINED, IN-LINE SPACER AND SWITCH, PARTICULARLY FOR A VEHICLE'S HEADLIGHT

FIELD OF THE INVENTION

The present invention relates to electrical switches and more particularly to a switch specifically designed for turning a light "on" and "off" in a vehicle, in addition to the vehicle's headlights, which switch is located in the vehicle's dashboard as part of a DC circuit, typically having a voltage of the order of twelve (12) volts. Additionally, the invention is directed to an electrical switch which is highly compact in its thickness and has a layered, sandwiched design.

BACKGROUND ART

It is common practice in the automotive art to include a headlight switch with a buzzer circuit for turning the parking and headlights "on" and "off" by means of a longitudinal pulling or pushing action, respectively, which switch is also combined with a rheostat for dimming or brightening the panel lights on the dashboard by a circular, twisting or rotary motion.

Likewise, this switching structure is used as well to turn a light "on" and "off," such as for example the interior dome light. The function of the dome light switch is to, for example, turn off the dome light circuit, when one or more of the vehicle's doors or tailgate is open, by rotating the shaft of the overall switch to the extreme clockwise position (as viewed from the front).

It has been the further practice to have such a composite switch be integrated in its design and occupy a relatively limited and particularly sized space with standardized mounting brackets located in particular locations, so that the composite switch can be mounted in a number of different cars within a car maker's line(s). As can be seen from the perspective of FIG. 1A, the rheostat 3 is centrally located between the electrical switching component 2 and the front bracketed portion 4, with respect to the longitudinal dimension.

In the prior art design, particularly for example in the "Chrysler" switch for this purpose, the "on"/"off" switch for the dome light was mounted on the side, exterior of the otherwise in-line construction, with the prior art switch having an exposed arm extending generally longitudinally and parallel to the center axis of the switch with its front end bent inwardly to position its distal tip adjacent to the side of the rheostat, so that a projection on the rheostat would cause the switch arm to be moved, breaking the normal electrical contact within the switch.

Such a design added to the bulk of the main switch body and caused significant alignment problems. Additionally, by extending off of the side of the main body of the switch, the dome light switch became more vulnerable to damage in handling and assembling into the vehicle. Sometimes the exposed switch arm became bent or misaligned, failing to thereafter engage the rheostat.

It additionally had excessive tolerance stack-ups on component parts. Also, the switch arm required ultrasonic welding between it and its associated terminal, a relatively difficult process.

DISCLOSURE OF THE INVENTION

The present invention in its preferred embodiment is designed to replace the outboard, dome light switch with an in-line, highly compact and reliable, relatively inexpensive switch of preferably layered construction which is positioned, not outboard of the main body of the in-line composite switch, but rather located centrally in-line in an area previously occupied by a spacer at the front area of the composite switch structure. The present invention, thus, does not add at all to the overall exterior bulk of the composite switch structure.

Additionally, by being mounted centrally in-line, it is activated by the rotation of the shaft upon which the other rotary parts of the composite switch are mounted, providing it with a direct drive, avoiding any dependency on, for example, mechanically interfacing an elongated exposed arm on the switch with a physical protrusion on the rheostat's surface.

Additionally, the present invention in its preferred embodiment, not only provides the "on"/"off" switch function for a vehicle light, such as for example the dome light, but also provides in a simple, reliable, inexpensive structure the same spacer function provided by the separate spacer in the prior art design.

This switch in its preferred embodiment is made in a layered fashion, that is one part being laid on top of the other as the switch structure is progressed along the longitudinal axis of the switch, forming a sandwiched, compact design having relatively few parts, which are also relatively easily and quickly assembled.

The compact, in-line size of the switch of the present invention preferably requires no changes to the other standard components now being used. It requires only, for example, about nine parts and has more positive and accurate timing than the prior art switch design. Unlike the prior art switch, all mechanical switch movements take place internally, minimizing the possibility of mechanical damage to the component parts from the exterior.

These and other objects and advantages of the present invention will become apparent from the following detailed description taken in connection with the accompanying drawings.

BRIEF DESCRIPTION OF THE DRAWINGS

FIG. 1A is a plan view of the overall headlight switch with buzzer circuit assembly including the preferred embodiment of the electrical dome light switch located in place of the standard, prior art spacer at the right, front end of the overall switch assembly, with the location of the prior art, outboard or piggy-back switch which it replaces being shown in phantom line; while

FIG. 3 is a plan view of the housing cover side of the preferred embodiment of the completely assembled dome light switch of the present invention, with a top portion thereof partially cut away showing the switch contacts being separated apart by the cam projection on the rotatable driver; while FIG. 4 is a side view thereof.

FIG. 5 is a plan view of the interior side of the back plate of the switch of FIGS. 3 & 4; while FIG. 6 is a side view thereof with a portion of the top being cut away.

FIG. 7 is plan view of the centrally located, interior driver element of the switch of FIGS. 3 & 4; while FIG. 8 is a side, cross-sectional view thereof.

FIG. 9 is a plan view of one of the two, identical, metal electrical connectors or terminal leads which are sandwiched between the front and back housing members within the interior of switch of FIGS. 3 & 4.

FIG. 10 is a plan view of the exterior side of the front housing plate of the switch of FIGS. 4 & 5; while FIG. 11 is a side view thereof, partially cut away.

FIG. 12 is a perspective, close-up view of the contact portions of the terminal leads in the "on"/"off" switch of FIGS. 3-11, showing the contacts about to be separated by the cam projection of the driver element of FIG. 7.

FIG. 13 is a schematic view of the overall electrical circuit diagram of the headlight switch with buzzer circuit, including the dome "on"/"off" switch performed by the dome light switch of the present invention, with the switch being shown in its "off" or open position.

FIG. 14 is a plan view of an alternate embodiment of the spacer/switch of the present invention, with its interior elements being shown in phantom line and the upper, right side portion being cut away showing the switch contact legs or leads with the internal driver being located in its switch opening position; while

BEST MODE FOR CARRYING OUT THE INVENTION

Figure 1A:
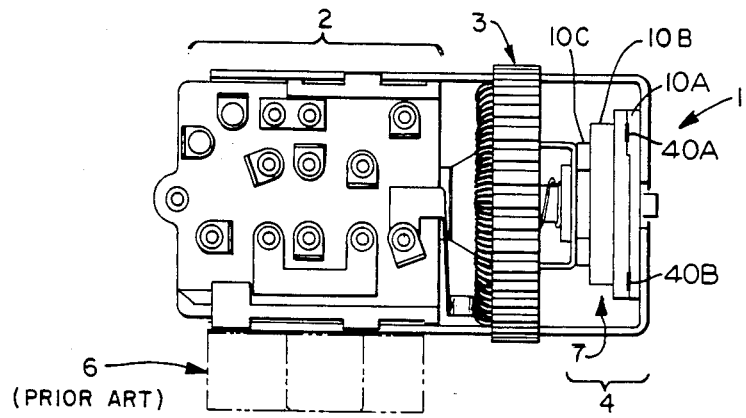
Figure 1B:
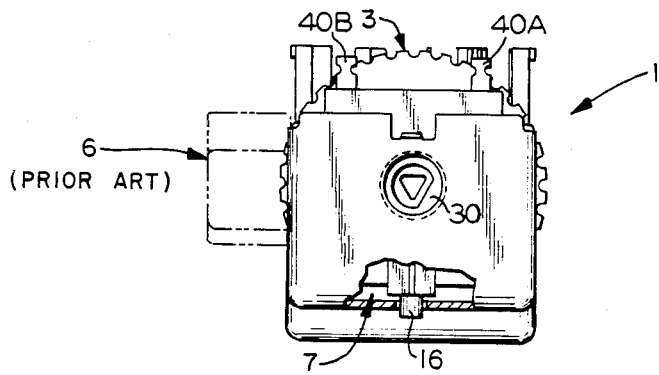
FIG. 1B is a front end view of the overall switch assembly, showing the end in which the spacer dome switch of the present invention is located, with the end plate partially cut away and with the location of the prior art, outboard switch being shown in phantom line.
Figure 2A:
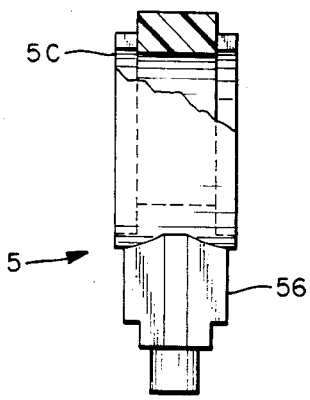
FIGS. 2A and 2B are side and end views, respectively, of the prior art spacer which is replaced by the dome light switch of the present invention, with the top part of the spacer in FIG. 2A being partially cut away.
Figure 2B:
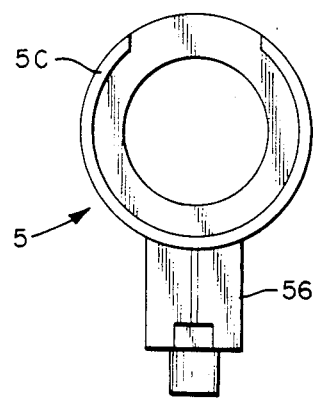

As can be seen in FIG. 1A, the overall, composite headlight switch with buzzer circuit 1 includes three basic components, the main electrical switching component 2, the rotary electrical rheostat 3 and the front bracketed portion 4 required to locate the rheostat assembly to the main switch bracket. In the prior art switch, the prior art spacer 5. (note FIGS. 2A & 2B) was located in the front area 4 of the overall composite switch structure, while the prior art dome light switch 6 (note phantom lined box in FIGS. 1A & 1B) was located outboard of the main body of the switch, hanging off of its side in piggy-back fashion.

However, in the preferred embodiment of the present invention, the dome "on"/"off" switch 7 is located within the, front area 4 in place of the spacer 5, the switch 7 not only providing the switching function for the dome light, but also serving structurally as a front spacer for the rheostat within the overall switch structure.

As will be explained more fully below, the dome light switch 7 (107) of the present invention preferably is made of a highly compact,, sandwiched, layered structure which is relatively simple to assemble and takes up very little space in its thickness along the longitudinal axis of the overall composite switch 1.

First Embodiment (FIGS. 3-12)

As can be seen in FIGS. 3 and 4, the completely assembled, rotary switch structure 7 includes a top, front element or housing cover 10, a relatively flat, rear, back element or housing 20, with a centrally located, internal driver or index 30, and two extended, terminal switch legs or leads 40A, 40B for wiring assembly.

As can be seen in FIGS. 5 and 6, the back housing element 20 includes a relatively flat, rectangular body having a central opening 21 with a chamfered periphery 22. Along one side edge, an elongated depression or relief area 23 is included, over which the distal legs 42 (note FIG. 9) of the two opposed, "L" shaped, electrical contactors 40 will be located, usually with their opposed dimple contacts 41 touching, the switch 7 usually being closed.

At one corner a raised plateau area 24 is included for positively aligning the appropriate corner of the back plate 20 with the matching recessed area 14 of the front element 10. (Note FIGS. 4 and 11 ) Four rivet holes 25, 25' are located in the four corners of the back plate 20 for matching with like holes 15 in the four corners of the front element 10 to attach them together, sandwiching the rotary driver 30 and the electrical contactors 40 between them. The rivets in the holes 25' flanking the elongated depression 23 also secure the contactors 40 through their rivet holes 45.

With reference to FIGS. 10 and 11, particularly the latter, it can be seen that the front housing element 10, includes in its interior and/or its top three distinct levels, a lowermost, enclosed level 10A, a generally enclosed intermediate level 10B and a top level 10C. When the switch 7 is assembled, the two metal electrical contactors 40A, 40B are located and held in level 10A, while the centrally located, interior driver 30 is located and held within level 10B with its lower end extending down into level 10A.

With reference to FIGS. 7 and 8, the centrally located, interior driver 30 includes a "D"-shaped hole or other non-circular hole or opening 31 in its central area for mating with the similarly configured main rotary shaft that slidingly extends centrally and longitudinally through most the composite switch structure 1. A user control knob (not illustrated) is located on the shaft, as it extends out to the right side of the overall switch structure as illustrated in FIG. 1A. The driver 30 is thus caused to be rotated, when the main shaft which extends through the opening 31 is rotated, which likewise concurrently rotates the rheostat 3. Additionally, because the "D" opening 31 only loosely, slidingly encircles the shaft in the longitudinal direction, the shaft can be pushed and pulled, moving it longitudinally, for actuating the headlights and parking lights through the main switch component 2, without moving the driver 30.

As is well known to the art, the overall composite headlight switch 1 is located in the dashboard of the vehicle, typically to the left of the steering wheel, from the perspective of the driver of the vehicle. In FIG. 1A, the general location of the vehicle's dashboard is generally illustrated by the dashed line "DB".

A cam projection 32 is located at one area along the periphery and at the bottom of the driver 30, which cam ultimately moves between the two contact legs 42 of the contactor terminal leads 40, until it ultimately reaches the springy, resilient distal ends of the contactors 40, causing the opposed, contact dimples 41 of the two contactors 40 to be separated, breaking the circuit and turning off the switch 7 (note FIG. 12). When the centrally located driver 30 is rotated back, the cam 32 no longer separates the distal ends of the contactors 40, and the circuit between the two contactors 40 is remade.

This breaking and making of the circuit causes the dome light to be turned "off" and "on", respectively, due to the way the various electrical elements are wired together, as shown generally in the circuit schematic of FIG. 13. As is well known in the art, the light circuit of FIG. 13 is a DC circuit having a voltage level typically of the order of twelve (12) volts.

The other ends 43 of the contactors 40A, 40B extend out of the housing (see FIGS. 1A & 1B and FIGS. 3 & 4) for connection into the electrical circuitry of the vehicle.

The front housing element 10 includes at its bottom a support stem or radially extending shaft 16, which is substantively identical in structure and function to the support stem or shaft 56 on the prior art spacer 5. Likewise the curved, projecting, gapped or semi-circle top level 10C of the front element 10 is substantively identical structurally and functionally to the curved, projecting, gapped or semi-circle central end 5C of the prior art spacer 5. Thus, the switch 7 not only performs the "on"/"off" switching function for the vehicle's dome light, but also serves the structural role of the spacer 5 of the prior art, combining these two functions in a synergistic fashion.

Examplary dimensions for the exemplary embodiment of FIGS. 3–11 are as follows—the lateral dimensions of the rear, back plate 20 can be 1.197 inches by 1.260 inches with the central opening 21 having a diameter of 0.493 inches. The entire, longitudinal thickness of the sandwiched switch structure 7, including the central, spacing projection 10C, can be for example 0.392 inches, or 0.314 inches without the spacing projection 10C. This highly compact, thin design easily fits within the longitudinal extent of the front bracket are 3 of the standard "Chrysler" switch and is well within the lateral confines defined by the lateral exteriors of the main switch component 2 for the headlights and the rheostat 3 (note FIG. 1B). With respect to the latter, it is noted that the diameter of the exemplary rheostat 3 is typically about 1.75 inches.

For applications of the switch 7 other than as the dome light, spacer switch for the standard headlight switch assembly, the top level 10C and the stem 16 could be eliminated, leaving a simple flat base with a centrally protruding circular plateau.

An exemplary insulating, moldable material for the front and back elements 10, 20 and the driver 30 is "CELCON".

Figure 14:
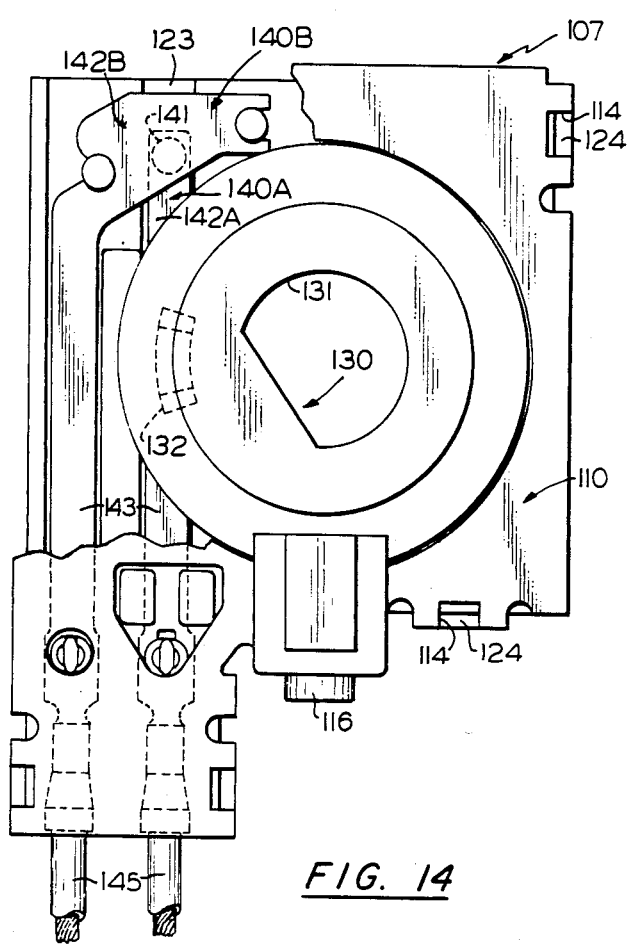
Figure 15:
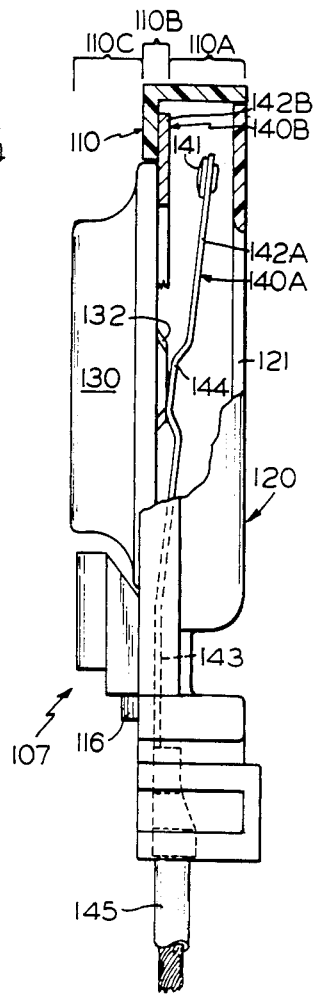
FIG. 15 is a side view thereof, with the upper, left side cut away, showing the terminal leads being separated apart by the bottom protrusion on the driver, breaking the switch.
Figure 16:
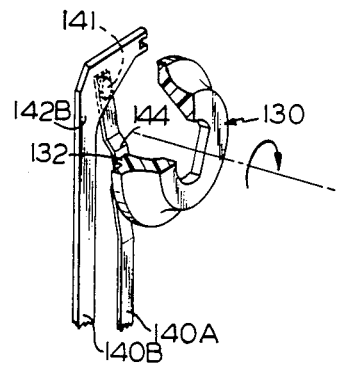
FIG. 16 is a perspective, close-up view of the contact portions of the terminal leads in the "on"/"off" dome light switch of FIGS. 14-15, with the driver partially cut away, showing the contacts being separated by the cam projection or protrusion of the driver element.

Second Embodiment (FIGS. 14–16)

A further embodiment of the in-line spacer/switch, as an alternate to that of FIGS. 3–11, is illustrated in FIGS. 14–16.

As can be seen in FIGS. 14 and 15, the completely assembled, rotary switch structure 107 includes a top, relatively flat, front element or housing cover 110, a rear, back element or housing 120, with a centrally located, internal driver or index 130, and two extended terminal switch legs or leads 140A, 140B for wiring assembly.

The switch leg 140A is basically straight, when viewed from the top as in FIG. 14, while the other 140B is "L" shaped, with the terminal end of the former overlapping the latter (note phantom line portion of 140A in FIG. 14). However, as can be seen in FIG. 16, when viewed from the side, the switch leg 140A is bent, and resiliently bears up with its dimple contact 141 biased against the underside of the switch leg 140B, when the switch is in its usual closed disposition.

The back housing element 120 includes a rectangular body, a portion of which is flat, having a central opening 121. Along one side, an elongated, straight depression or relief area 123 is included, into which the terminal switch leg 140A is located, with a further sufficient depth to allow the contact end 142A to be moved down out of contact with the other switch leg 140B. However, the legs 140A & 140B will usually be in contact with the dimple contact 141 on leg 140A touching the flat, upper, underside portion 142B of the leg 140B, the switch 107 thus usually being closed.

Various raised, mating extentions 124 on the rear housing element 120 are included about the periphery of the switch 107 for positively aligning the appropriate parts of the back housing element 120 with matching openings 114 in the front element 110 for a locking snap fit. The snap fit of the housing elements 110 & 120 together sandwich the rotary driver 130 and the electrical contactors 140A & 140B between them.

With reference to FIG. 15, the front element 110 includes in its interior and/or its top three levels, a lowermost, enclosed level 110A, a generally enclosed intermediate level 110B and a top level 110C. When the switch 107 is assembled, the two metal electrical contactors 140A, 140B are located and held generally in level 110B, with contactor 140A extending and further movable down into level 110A, while the centrally located, interior driver 130 is located and held within the top part of level 110B with its lower cam extension end 132 extending down to level 110A and its upper portion forming part of level 110C.

The centrally located, interior driver 130 includes a "D"-shaped hole or other non-circular hole or opening 131 in its central area for mating with the similarly configured main rotary shaft that slidingly extends centrally and longitudinally through most the composite switch structure A user control knob (not illustrated) is located on the shaft, as it extends out to the right side of the overall switch structure as illustrated in FIG. 1A. The driver 130 is thus caused to be rotated, when the main shaft which extends through the opening 131 is rotated, which likewise concurrently rotates the rheostat 3. Additionally, because the "D" opening 131 only loosely, slidingly encircles the shaft in the longitudinal direction, the shaft can be pushed and pulled, moving it longitudinally, for actuating the headlights and parking lights through the main switch component 2, without moving the driver 130.

A bottom cam or landing projection 132 is located at one area at the periphery and at the bottom of the driver 130. The projection 132, when the driver 130 is rotated, ultimately moves into contact with contactor leg 140A at the raised portion 144 on contactor area 142A, until it ultimately pushes the springy, resilient distal end of the contactor 140A away from the flat, fixed portion 142B of the contactor 140B. This causes the contactor dimple 141 of the contactor 140A to be separated away from contactor 140B, breaking the circuit and turning off the switch 107.

As can best be seen in FIGS. 15 & 16, the contactor 140A has on its distal end 142A an opposed projection or landing 144, which interfaces with the cam protrusion 132, as the switch legs 140A & 140B are being separated.

When the centrally located driver 130 is rotated back, the cam projection, landing or protrusion 132 no longer causes the distal ends of the contactors 140A & 140B to be separated, and the circuit between the two contactors 140 is remade.

This breaking and making of the circuit causes the dome light to be turned "off" and "on", respectively, due to the way the various electrical elements are wired together, as shown generally in the circuit schematic of FIG. 13.

The other ends 143 of the contactors 140A, 140B extend out of the inner housing area (see FIGS. 14 & 15) for connection into the electrical circuitry of the vehicle through supplemental wires 145.

The front element 110 includes at its bottom a support stem or radially extending shaft 116, which is substantively identical in structure and function to the support stem or shaft 56 on the prior art spacer 5. To the extent necessary, the exterior form of the housing can be configured to likewise conform to the other necessary support, spacing or other structural aspects of the prior art spacer 5. Thus, the switch 107 not only performs the "on"/"off" switching function for the vehicle's dome light, but also serves the structural role of the spacer 5 of the prior art, combining these two functions in a synergistic fashion.

It should be understood that, although the preferred embodiments have been described with respect to the switch controlling the "on"/"off" functions of the vehicle's dome light, the principles or the present invention can be applied as well to other vehicle lights or other electrical components, as desired.

Hence, although this invention has been shown and described with respect to two detailed, exemplary embodiments thereof, it will be understood by those skilled in the art that various changes in form, detail and application thereof may be made without departing from the spirit and scope of the claimed invention.

Having thus described two typical or exemplary embodiments of the invention, that which is claimed as new and desired to be secured by Letters Patent is:

1. In a vehicle having headlights with an "on"/"off" switch, a dashboard and a supplemental electrical device to be controlled by another electrical switch, as part of a DC circuit having voltage of the order of about 12 volts, with a composite switch structure for both the headlight switch and the other electrical switch located in the dashboard of the vehicle, which switch structure includes longitudinally in line a basic switching body for the headlights, a centrally located rheostat having a connection for a main, rotary shaft actuated by the vehicle driver and a front bracket area located nearest to the front of the dashboard, the improvement comprising:
 said other switch for said supplemental electrical device being located within said front bracket area located nearest to the front of said vehicle dashboard, substantially all of the structure making up said other switch being located completely within the lateral confines defined by the lateral exteriors of said basic switching body and the centrally located rheostat.

2. The improvement of claim 1, wherein said other switch is located centrally in line with the basic switching body and the rheostat and further includes at least two electrical contacts and a rotary member mounted for relative rotational movement with respect to said electrical contacts, such rotational movement alternately breaking and making the electrical circuit of said switch.

3. The improvement of claim 2, wherein the vehicle includes a dome light and said other switch is a dome switch controlling DC power to said dome light and comprises a relatively flat, compact structure including:
 a front element;
 a back element connected to said front element, at least one of said element being relatively flat;
 a centrally located, rotatable driver sandwiched between said front and back elements; and
 a pair of electrical contactors sandwiched between said front and back elements and located adjacent to said centrally located driver, the rotation of said driver causing said contactors to become alternately disengaged and engaged, alternately breaking and making the electrical circuit of said other switch.

4. The improvement of claim 3, wherein said driver is mounted for its rotary movement about an axis coincident with the axis of the main rotary shaft, and wherein said driver has opening means through it in the longitudinal direction for mating with and having extended through it the main, rotary shaft for the rheostat for common rotary movement therewith.

5. The improvement of claim 4, wherein said driver includes a peripheral cam portion extending out from its periphery; and
 wherein said contactors have overlapping extensions which generally are in contact with one another, the movement of said cam portion passing into contact with at least one of said overlapping extensions, ultimately causing them to become separated from one another, breaking the electrical DC circuit of said switch.

6. The improvement of claim 4, wherein an elongated depressed area is located within one of said elements underlying the area where said two contactor extensions overlap.

7. The improvement of claim 1, wherein said other switch has a centrally located, curved, longitudinal projection and a radially extending support stem, structurally serving as a spacer in the front area of the headlight switch for the rheostat.

8. A method of providing a more compact composite switch structure for a vehicle having headlights with an "on"/"off" switch, a dashboard and a supplemental electrical device to be controlled by another electrical switch, as part of a DC circuit having a voltage of the order of about twelve volts, with the composite switch structure being use to control both the headlight switch and the other electrical switch, which composite switch is to be located in the dashboard of the vehicle and which switch structure includes longitudinally in line a basic switching body for the headlights, a centrally located rheostat having a connection for a main, rotary shaft actuated by the vehicle driver and a front bracket area located nearest to the front of the dashboard, comprising the following step(s):
 locating said other switch for said supplemental electrical device within said front bracket area located nearest to the front of said vehicle dashboard, substantially all of the structure making up said other switch being located completely with the lateral confines defined by the lateral exteriors of said basic switching body and the rheostat.

9. The method of claim 8, where there is included the following additional step(s):
 designing the outer dimensions and configuration of said composite switch structure to be able to use it as a spacer between said rheostat and said bracket front and using said composite switch to also serve as space in place of the spacer previously used in such switches.

* * * * *

UNITED STATES PATENT AND TRADEMARK OFFICE
CERTIFICATE OF CORRECTION

PATENT NO. : 4,827,241

DATED : May 2, 1989

INVENTOR(S) : William M. Riser et al

It is certified that error appears in the above-identified patent and that said Letters Patent is hereby corrected as shown below:

Col. 1, lines 36-40, beginning with "As" move this sentence to Col. 3, line 45 after "bracket".

Col. 3, line 45, see above.

Col. 5, line 36, change "are" to --area--.

Col. 6, line 40, after "structure" insert --1--.

Col. 7, line 29, change "or" to --of--.

ON THE FRONT PAGE ITEM (22) - Change the filing date from "November 3, 1987" to --October 30, 1987--.

Signed and Sealed this

Ninth Day of April, 1991

*Attest:*

HARRY F. MANBECK, JR.

*Attesting Officer*     *Commissioner of Patents and Trademarks*